United States Patent
Simi

(10) Patent No.: US 9,780,638 B2
(45) Date of Patent: Oct. 3, 2017

(54) GENERATION OF DRIVE CURRENT INDEPENDENT OF INPUT VOLTAGE

(71) Applicant: LEDVANCE LLC, Wilmington, MA (US)

(72) Inventor: Victor M. Simi, Lexington, KY (US)

(73) Assignee: LEDVANCE LLC, Wilmington, MA (US)

( * ) Notice: Subject to any disclaimer, the term of this patent is extended or adjusted under 35 U.S.C. 154(b) by 106 days.

(21) Appl. No.: 14/494,528

(22) Filed: Sep. 23, 2014

(65) Prior Publication Data

US 2016/0087524 A1  Mar. 24, 2016

(51) Int. Cl.
| | |
|---|---|
| *H02M 1/36* | (2007.01) |
| *H02M 1/32* | (2007.01) |
| *H02M 1/42* | (2007.01) |
| *H02M 3/335* | (2006.01) |
| *H05B 33/08* | (2006.01) |
| *H02M 1/44* | (2007.01) |
| *H02M 1/00* | (2006.01) |

(52) U.S. Cl.
CPC .............. *H02M 1/32* (2013.01); *H02M 1/36* (2013.01); *H02M 1/4258* (2013.01); *H02M 3/33523* (2013.01); *H05B 33/0815* (2013.01); *H05B 33/0887* (2013.01); *H02M 1/44* (2013.01); *H02M 2001/0006* (2013.01); *Y02B 20/341* (2013.01); *Y02B 70/126* (2013.01)

(58) Field of Classification Search
CPC ............ H02M 1/08; H02M 1/32; H02M 1/36; H02M 1/4208; H02M 1/4258; H02M 3/33507

USPC ........ 363/20, 21.01, 21.04, 21.1, 49, 53, 89, 363/95, 97

See application file for complete search history.

(56) References Cited

U.S. PATENT DOCUMENTS

| | | | | |
|---|---|---|---|---|
| 5,923,543 A | * | 7/1999 | Choi ................ | H02M 3/33569 363/19 |
| 6,088,250 A | * | 7/2000 | Siri ........................ | H02J 1/102 320/133 |

(Continued)

OTHER PUBLICATIONS

L6562 Transition-Mode PFC Controller, Nov. 2005, pp. 1-16, Revision 8, STMicroelectronics, Geneva, Switzerland.

(Continued)

*Primary Examiner* — Jeffrey Sterrett
(74) *Attorney, Agent, or Firm* — Andrew Martin

(57) ABSTRACT

Systems and methods to generate drive current in a power supply, independent of the input voltage, are provided. The power supply includes front end circuitry, control circuitry, and drive circuitry. The front end circuitry includes protection circuitry to defend against damage from EMI, voltage spikes, and the like. The control circuitry includes startup circuitry, power factor correction (PFC) circuitry, and output power configuration circuitry. The startup circuitry provides operational voltage to the PFC circuitry, derived from an input voltage, until an internally generated operational voltage becomes available. The PFC circuitry uses the operational voltage to generate output power for the drive circuitry based on the output power configuration circuitry. The drive circuitry includes drive current configuration circuitry to generate a drive current to drive a load, coupled to the power supply, independent of the input voltage.

17 Claims, 4 Drawing Sheets

(56) References Cited

U.S. PATENT DOCUMENTS

| | | | | |
|---|---|---|---|---|
| 6,246,597 | B1* | 6/2001 | Peron | H02M 7/1555 |
| | | | | 323/303 |
| 6,385,061 | B1* | 5/2002 | Turchi | H02M 1/34 |
| | | | | 323/902 |
| 7,480,157 | B1* | 1/2009 | Soeng | H02M 1/4258 |
| | | | | 323/285 |
| 7,667,990 | B2* | 2/2010 | Liu | H02M 1/4208 |
| | | | | 363/21.01 |
| 2004/0156160 | A1* | 8/2004 | Choo | H02H 7/1252 |
| | | | | 361/118 |
| 2008/0018261 | A1 | 1/2008 | Kastner | |
| 2009/0212726 | A1* | 8/2009 | Baudesson | H02M 1/32 |
| | | | | 318/400.3 |
| 2011/0068703 | A1 | 3/2011 | McKinney | |
| 2013/0107585 | A1* | 5/2013 | Sims | H02M 3/33592 |
| | | | | 363/21.14 |
| 2013/0127358 | A1* | 5/2013 | Yao | H05B 33/0815 |
| | | | | 315/201 |
| 2013/0129373 | A1* | 5/2013 | Inukai | H02M 1/32 |
| | | | | 399/88 |
| 2014/0254210 | A1* | 9/2014 | Hayasaki | G03G 15/80 |
| | | | | 363/21.12 |
| 2014/0254215 | A1* | 9/2014 | Brinlee | H02M 3/33507 |
| | | | | 363/21.15 |
| 2015/0244271 | A1* | 8/2015 | Lin | H02M 3/33584 |
| | | | | 363/21.1 |
| 2015/0244274 | A1* | 8/2015 | Fahlenkamp | H02M 3/33507 |
| | | | | 363/21.15 |
| 2015/0280576 | A1* | 10/2015 | Hinz | H02M 3/33507 |
| | | | | 363/21.15 |
| 2016/0087524 | A1* | 3/2016 | Simi | H02M 1/4208 |
| | | | | 323/205 |

OTHER PUBLICATIONS

TL431 Precision Programmable Reference, Jan. 2014, pp. 1-71, SLVS543N, Texas Instruments, Dallas, Texas, USA.

* cited by examiner

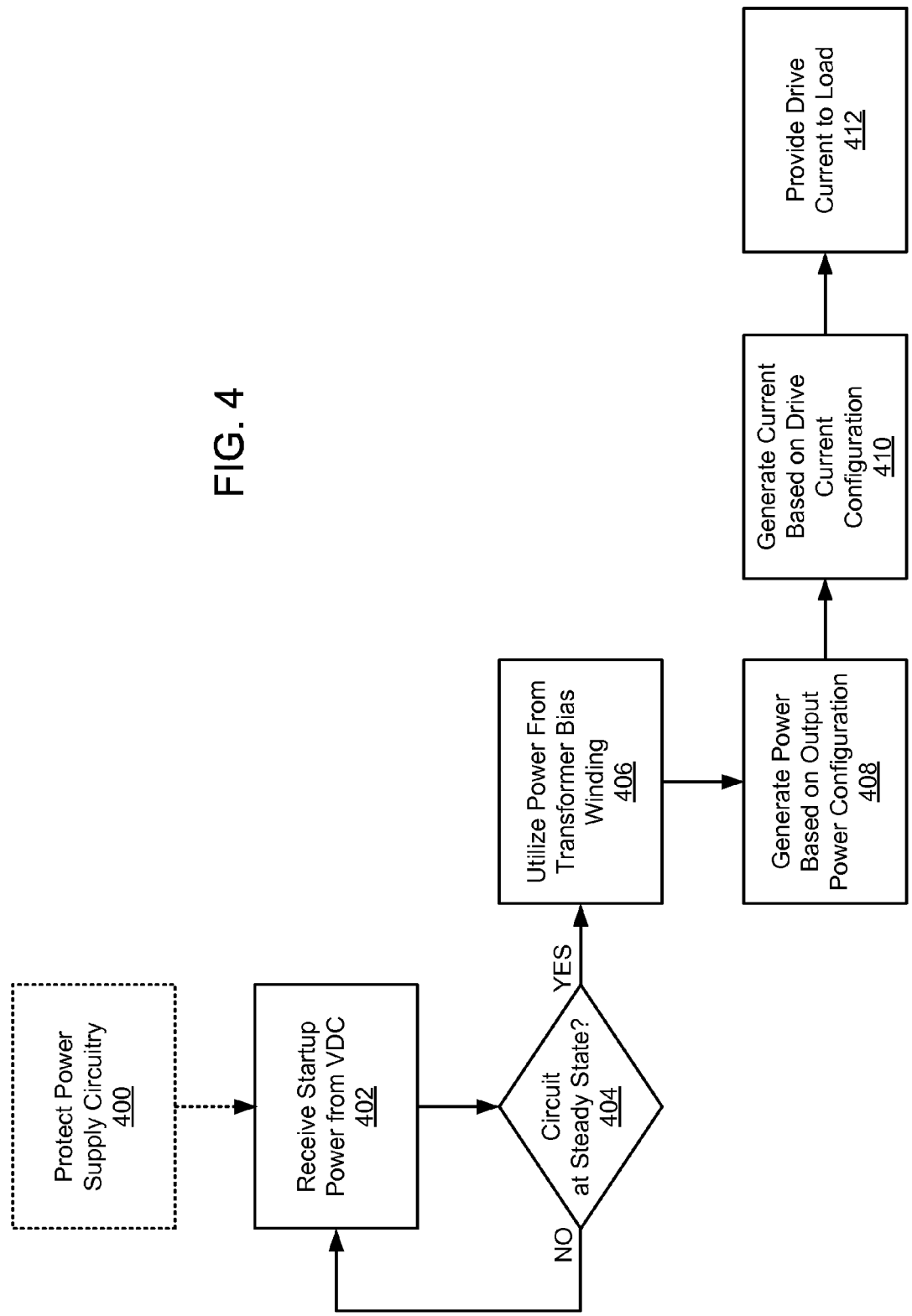

GENERATION OF DRIVE CURRENT INDEPENDENT OF INPUT VOLTAGE

TECHNICAL FIELD

The present invention relates to electronics, and more specifically, to power supplies for electronics.

BACKGROUND

Electronic components and devices typically require input power to operate that is not available by simply directly connecting the component or device to mainline power. Thus, a power supply is typically used to provide the necessary input power. Power supplies are usually designed with certain applications in mind. That is, a power supply is usually designed to output a certain range of voltage and/or current typically required by a certain application or by certain distinct types of devices.

SUMMARY

For broader applications, or different types of related devices, it may be useful to have a power supply that has a wider range of output. For example, designing a power supply that receives a certain input voltage and generates a certain output current to drive a load may be effective in that application, but this requires the designer to revisit the design each time different operational parameters arise. It would be more beneficial to design a single power supply circuit that is able to operate in a variety of different scenarios having different operational parameters such as, for example, different input voltages, different types of loads to be driven with the input voltage, etc. For example, it may be desirable to have the flexibility of changing operational parameters in a power supply by replacing a few rudimentary components without requiring a total redesign. Moreover, the inclusion of protective measures in a power supply may be important to account for scenarios including electromagnetic interference (EMI), high voltage transients, and the like.

Embodiments provide a power supply that generates a drive current independent of the input voltage to the power supply. In some embodiments, the power supply includes front end circuitry, control circuitry, and drive circuitry. The front end circuitry receives an input voltage and may include protection circuitry to protect against being damaged from EMI, voltage spikes, and the like. The control circuitry includes startup circuitry, power factor correction (PFC) circuitry, and output power configuration circuitry. The startup circuitry provides operational voltage to the PFC circuitry derived from the input voltage until an internally generated operational voltage is available. The operational voltage is then used by the PFC circuitry to generate output power for the drive circuitry based on the output power configuration circuitry. The drive circuitry includes drive current configuration circuitry to generate a drive current for a load independent of the input voltage.

In an embodiment, there is provided a power supply to generate a current to drive a load. The power supply includes: front end circuitry to generate a direct-current voltage based on an input voltage; control circuitry to control generation of output power based on the direct-current voltage, the control circuitry including at least output power configuration circuitry; and drive circuitry to generate the at least one current based on the output power, the drive circuitry including at least drive current configuration circuitry.

In a related embodiment, the front end circuitry may include protection circuitry. In a further related embodiment, the protection circuitry may include a metal oxide varistor to protect the power supply from being damaged by high voltage line transients. In another further related embodiment, the protection circuitry may include electromagnetic interference filter circuitry to protect the power supply from being damaged by electromagnetic interference, the electromagnetic interference filter circuitry may include: two inductors, each of the inductors being coupled between an alternating-current input voltage and a diode rectifier in the front end circuitry; and a capacitor coupling the two inductors together on a side of each of the two inductors coupled to the diode rectifier.

In another related embodiment, the control circuitry may further include startup circuitry and power factory correction circuitry. In a further related embodiment, the startup circuitry may include a resistor and a capacitor to generate a voltage to operate the power factor correction circuitry based on the direct-current voltage generated by the front end circuitry during a time period when the power supply is starting; and a diode to generate the voltage to operate the power factor correction circuitry with the capacitor based on voltage generated by a transformer in the drive circuitry following the time period when the power supply is starting. In another further related embodiment, the power factor correction circuitry may include a transition-mode power factor correction controller including a pulse width modulation comparator input coupled to a source of a transistor in the drive circuitry. In a further related embodiment, the output power configuration circuitry may include a resistor coupled between ground and the pulse width modulation comparator input, the resistor having a resistance value selected to cause the control circuitry to control the drive circuitry to generate a certain output power. In another further related embodiment, the drive current configuration circuitry may include: precision programmable reference circuitry; a resistor coupled to the precision programmable reference circuitry to bias the precision programmable reference circuitry; and two feedback bias resistors coupled in series across the precision programmable reference circuitry. In a further related embodiment, a junction between the two feedback bias resistors in the drive current configuration circuitry may be coupled through a resistor to an inverting input of an error amplifier in the transition-mode power factor correction controller. In another further related embodiment, the two feedback bias resistors in the drive current configuration circuitry may have resistance values selected to cause the drive circuitry to generate a certain drive current to drive the load. In a further related embodiment, the drive current configuration circuitry causes the drive circuitry to generate the certain drive current to drive the load independently of the input voltage.

In another embodiment, there is provided a method. The method includes: operating control circuitry in a power supply coupled to a load; causing drive circuitry in the power supply to generate output power based on output power configuration circuitry in the control circuitry; and generating a drive current to drive the load by utilizing the output power in the drive circuitry, the drive current being generated based on drive current configuration circuitry in the drive circuitry.

In a related embodiment, operating may include generating a voltage to operate the control circuitry based on a direct-current voltage generated by front end circuitry in the power supply during a time period when the power supply is starting. In a further related embodiment, operating may include generating a voltage to operate the control circuitry based on a voltage generated by a transformer in the drive circuitry following the time period when the power supply is starting.

In another related embodiment causing may include configuring the output power to be generated by the drive circuitry by selecting a resistance value of a resistor in the output power configuration circuitry, the resistor being coupled between ground and a pulse width modulation comparator input in a transition-mode power factor correction controller in the control circuitry. In a further related embodiment, generating may include configuring the drive current to be generated by the drive circuitry by selecting resistance values for two feedback bias resistors coupled in series across precision programmable reference circuitry in the drive current configuration circuitry. In a further related embodiment, the method may further include providing feedback to an inverting input of an error amplifier in the transition-mode power factor correction controller from a junction between the two feedback bias resistors in the drive current configuration circuitry.

In yet another related embodiment, the method may further include protecting the power supply utilizing protection circuitry in the front end circuitry.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 4 is a flowchart of operations to generate drive current independent of input voltage according to embodiments disclosed herein.

DETAILED DESCRIPTION

Figure 1:
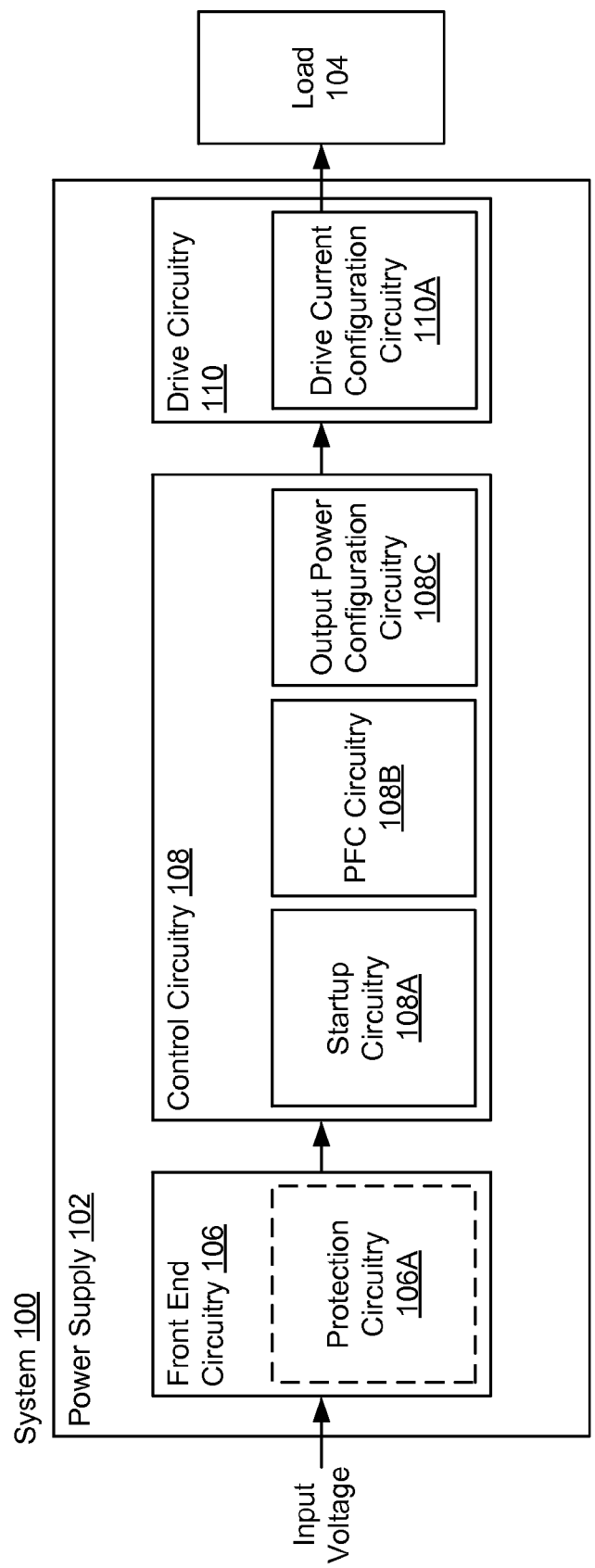
FIG. 1 illustrates a block diagram of a power supply according to embodiments disclosed herein.

FIG. 1 illustrates a block diagram of a system 100. While embodiments are described throughout as including certain components, rearrangement, insertion, replacement, and/or removal of components, component values, etc. is permissible and expected in line with the teachings found throughout. The system 100 includes a power supply 102 and a load 104. The power supply 102 includes, in some embodiments, front end circuitry 106, control circuitry 108, and drive circuitry 110. The power supply 102 is configured to receive an input voltage via the front end circuitry 106. The input voltage may, and in some embodiments does, include alternating-current (AC) or direct current (DC) voltage supplied by various sources including, for example but not limited to, a power grid, storage cells (e.g., batteries), off-grid generation based on technologies such as solar, wind, fossil fuel, reactive chemical cells, etc. The front end circuitry 106, in some embodiments, includes protection circuitry 106A and, is configured to receive the input voltage and to generate a DC voltage based on the input voltage. The control circuitry 108 includes startup circuitry 108A, PFC circuitry 108B, and output power configuration circuitry 108C. The control circuitry 108 is configured to generate output power utilizing the DC voltage received from the front end circuitry 106. The drive circuitry 110 includes drive current configuration circuitry 110A, and is configured to utilize the output power to generate a drive current to drive the load 104. The load 104 may be, and in some embodiments is, any component, device, and/or grouping/combination thereof that requires power from the power supply 102.

Figure 2:
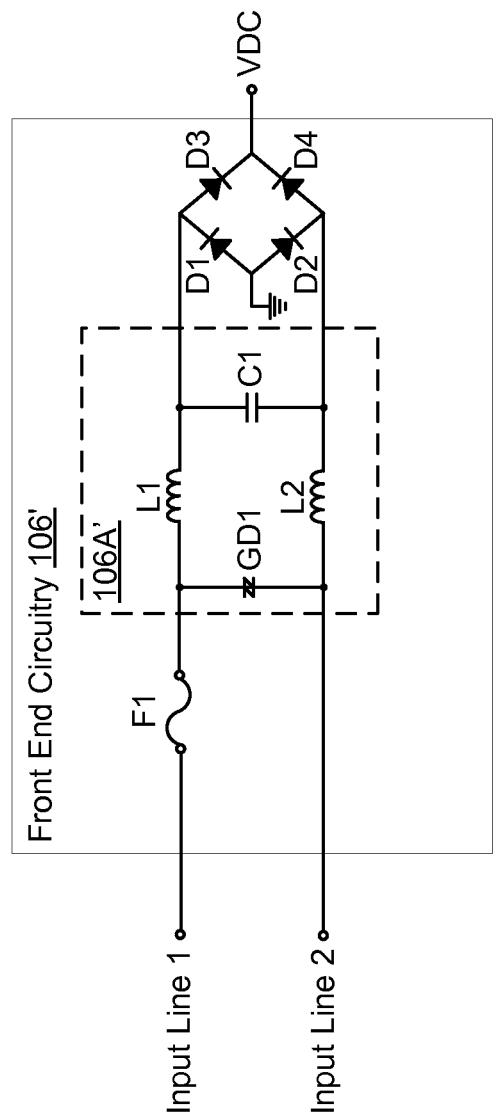
FIG. 2 illustrates a circuit diagram of front end circuitry of a power supply, such as the power supply of FIG. 1, according to embodiments disclosed herein.

FIG. 2 is a circuit diagram of front end circuitry 106'. It is important to note that, while the front end circuitry 106' may be and in some embodiments is configured to receive an AC input voltage including at least energized input line 1 and input line 2, this configuration is merely for the sake of explanation. The front end circuitry 106' may also be, and in some embodiments is, configured to receive other AC inputs or DC inputs. Thus, an input voltage is supplied to the front end circuitry 106', via the input line 1 and the input line 2, through a fuse F1 and, in some embodiments, protection circuitry 106A'. The protection circuitry 106A' includes, for example, a gas discharge tube GD1 connected between the fuse F1 and the input line 2, an inductor L1 connected to the fuse F1, an inductor L2 connected to the input line 2, and a capacitor C1 connected between the inductor L1 and the inductor L2. In some embodiments, the gas discharge tube GD1 is a sealed device that contains an inert gas mixture trapped between two electrodes. The inert gas mixture normally acts as an insulator, but will conduct electric current after becoming ionized by high voltage. During a high voltage spike, the gas discharge tube GD1 may create an effective short circuit, allowing the excess power to be safely directed to ground. Thus, the location of the gas discharge tube GD1 in the front end circuitry 106' safely redirects current resulting from high voltage spikes on the input line 1 and the input line 2 to prevent damage to other components connected to the front end circuitry 106', such as but not limited to the power supply 102 and/or the load 104 of FIG. 1. The inductors L1 and L2, along with the capacitor C1, are configured to stabilize an input AC voltage and/or filter out any EMI. The front end circuitry 106' also includes a first diode D1, a second diode D2, a third diode D3, and a fourth diode D4, arranged as a bridge rectifier D1-D4. In embodiments without the protection circuitry 106A', the bridge rectifier D1-D4 is connected between the fuse F1 and the input line 2. In embodiments including the protection circuitry 106A', the bridge rectifier D1-D4 is connected in parallel with the capacitor C1. The bridge rectifier D1-D4 converts an AC input voltage into a DC voltage (VDC).

Figure 3:
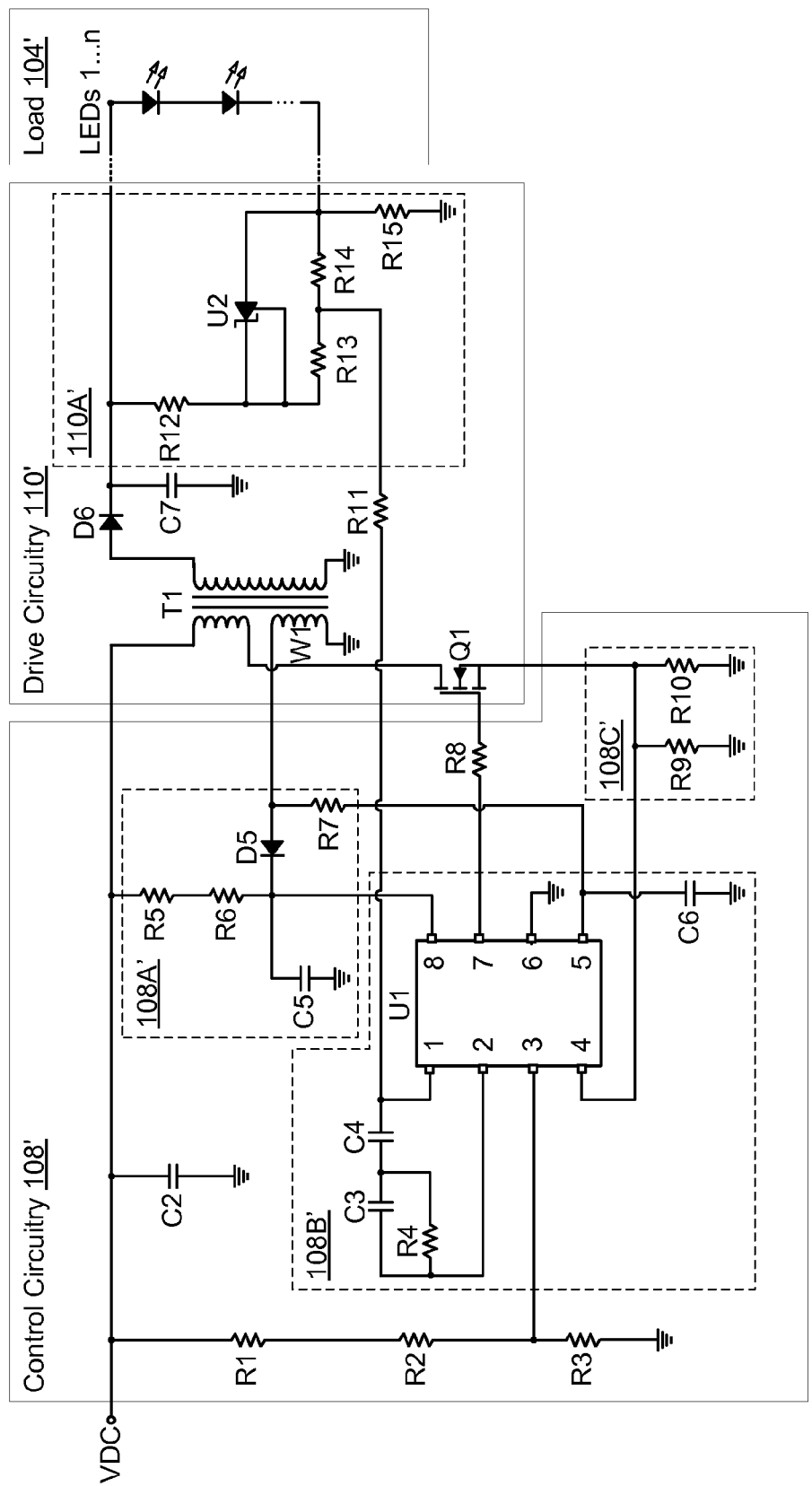
FIG. 3 illustrates a circuit diagram of control circuitry and drive circuitry of a power supply, such as the power supply of FIG. 1, according to embodiments disclosed herein.

FIG. 3 is a circuit diagram of control circuitry 108' and drive circuitry 110'. Though embodiments herein are explained in terms of DC to DC (DC/DC) converter using a PFC flyback architecture, other DC/DC converter technologies may also be, and in some embodiments are, employed, such as but not limited to buck, boost, buck-boost, uk, inverting, single-ended primary-inductor converter (SEPIC), etc. The control circuitry 108' is configured to perform power factor correction on an input VDC to maximize the amount of active (useful) power generated in the drive circuitry 110/110', thus improving the overall efficiency of the power supply 102. A capacitor C2 is connected between the input VDC and ground, and is configured to stabilize and/or filter the input VDC. The input VDC is, in some embodiments, reduced via a voltage divider formed by the series connection a first resistor R1, a second resistor R2, and a third resistor R3 between the input VDC and ground. The reduced voltage from a connection point between the second resistor R2 and the third resistor R3 is supplied to a controller U1, which is configured to operate PFC circuitry 108B'. Many of the components surrounding the controller U1 in the PFC circuitry 108B' may vary depending on the selected controller. In some embodiments, such as shown in FIG. 3, the controller U1 is a L6562 Transition-Mode PFC controller manufactured by ST Microelectronics Inc., though of course other controllers may be, and in some embodiments are, used. More specifically, a pin 3 of the controller U1 receives the reduced voltage from the voltage divider. In some embodiments, the pin 3 is the main multiplier input of the controller U1. The input VDC is also supplied to startup circuitry 108A', which is designed to initially supply the controller U1 with an operational voltage based on the input VDC, and to then switch over to an operational voltage generated within the power supply 102 (e.g., by a transformer T1) when steady state operation is reached.

The startup circuitry 108A' includes a fifth resistor R5 in series with a sixth resistor R6 between the input VDC and a pin 8 of the controller U1. The startup circuitry 108A' also includes a fifth capacitor C5 between the pin 8 and ground, and a fifth diode D5 having an anode and a cathode, with the cathode also connected to the pin 8 and the anode connected to drive circuitry 110'. A seventh resistor R7 is connected between the anode of the fifth diode D5 and a pin 5 of the controller U1. In some embodiments, upon activation of the power supply 102, the front end circuitry 106/106' supplies the input VDC to the control circuitry 108'. For a certain period of time following startup, the generation of the input VDC may cause a current to flow through the fifth resistor R5 and the sixth resistor R6 in the startup circuitry 108A', the current being directed by the fifth diode D5 to charge the fifth capacitor C5. The voltage across the fifth capacitor C5 is then supplied to the pin 8, which in some embodiments is the VCC pin, of the controller U1, causing the controller U1 to initiate operation. Following the period of time after startup (e.g., after the power supply 102 reaches steady state), the transformer T1 will begin to generate voltage in a bias winding W1, as described in greater detail below. The bias winding W1, which is connected between ground and the anode of the fifth diode D5, will began to generate current through the fifth diode D5 to charge the fifth capacitor C5, replacing the current being provided by the input VDC. The voltage produced by the bias winding W1 will also generate a current through the seventh resistor R7. This charges a sixth capacitor C6 in the PFC circuitry 108B', which is connected between the pin 5 and ground. The charge across the sixth capacitor C6 provides voltage to the pin 5 of the controller U1 (which, in some embodiments, is a zero crossing detector (ZCD), and causes a transistor Q1 in the drive circuitry 110' to turn on based on a negative-edge going trigger). The controller U1 may continue operation using power generated from the transformer T1 instead of the input VDC, improving operational efficiency.

The controller U1 is part of the PFC circuitry 108B', along with a third capacitor C3, a fourth capacitor C4, a fourth resistor R4, and the sixth capacitor C6. The third capacitor C3 and the fourth capacitor C4 are connected in series between a pin 1 of the controller U1 and a pin 2 of the controller U1. The fourth resistor R4 is connected in parallel across the third capacitor C3. The fourth resistor R4, the third capacitor C3, and the fourth capacitor C4 form an error amplifier coupled to the pins 1 and 2 of the controller U1 (which, in some embodiments, are the inverting input pin and the error amplifier output pin, respectively). The error amplifier serves as a compensation network to achieve stability in the voltage control loop and to ensure high power factor and low total harmonic distortion (THD). For example, in some embodiments, the values of these components are selected to set a cutoff frequency of 20 Hz to ensure a high power factor. In some embodiments, the error amplifier is fed with a feedback voltage from the drive circuitry 110' through an eleventh resistor R11, which is connected to the pin 1 of the controller U1.

The output voltage of the control circuitry 108' is controlled by a pin 7 of the controller U1 (which, in some embodiments, is the gate driver output). The pin 7 is coupled to a gate of the transistor Q1 (which, in some embodiments, is an n-channel MOSFET) through an eighth resistor R8. In some embodiments, the controller U1 is configured to control the transistor Q1 based on an internally generated pulse width modulation (PWM) signal. A pin 6 of the controller U1 (which, in some embodiments, is GND) is coupled to ground.

In some embodiments, an output power configuration circuitry 108C' includes at least a ninth resistor R9 in parallel with a tenth resistor R10 between a pin 4 of the controller U1 (which, in some embodiments, is CS) and ground. The pin 4 is also connected to a drain of the transistor Q1. The pin 4, in some embodiments, is an input to a PWM signal comparator in the controller U1 that senses the current through the transistor Q1 as a voltage for use in determining a turn off for the transistor Q1 in the drive circuitry 110', and thus, for determining the output power generated by the power supply 102. In some embodiments, the output power configuration circuitry 108C' affects the voltage seen at the pin 4 through the selection of resistance values for the ninth resistor R9 and the tenth resistor R10, and thus, may control the output power. Resistance values for the ninth resistor R9 and/or the tenth resistor R10 may be, and in some embodiments are, selected based on, for example but not limited to, the power needed to be generated by the drive circuitry 110' (e.g., for generating a drive current to the load 104'). In this manner, the power supply 102 is readily scalable for different uses simply by replacing the ninth resistor R9 and/or the tenth resistor R10 in the output power configuration circuitry 108C'.

The drive circuitry 110' is illustrated in FIG. 3 as having a "flyback" configuration, though of course other configurations are possible. Generally, the controller U1 in the control circuitry 108' is configured to turn on the transistor Q1, causing current to flow through the transformer T1 until it reaches a peak amount set by the controller U1. The peak may be a level determined by, for example, a DC bias on the pins 1 and 3 of the controller U1. After the transistor Q1 turns off, an output current may begin to flow through a sixth diode D6 until all of the energy in the transformer T1 is expended. The sixth diode D6 includes an anode and a cathode, with the anode connected to a secondary winding of the transformer T1 and the cathode connected to the load 104'. Upon reaching this condition, the secondary winding of the transformer T1 may then produce a negative transition, which the controller U1 may use to initiate another cycle. A seventh capacitor C7, connected between the cathode of the sixth diode D6 and ground, is configured to store energy to be released to the load 104' during the time that the transistor Q1 is in the off state. The current through the transistor Q1 is regulated by a multiplier circuit within the controller U1. As described above, the output power may be set through selection of the components in the feedback loop coupled to the pin 4 of the controller U1 (e.g., including the output power configuration circuitry 108C'). The load 104' includes, for example, in some embodiments, multiple solid state light sources, though of course any load is possible.

In some embodiments, drive current configuration circuitry 110A' within the drive circuitry 110' includes a twelfth resistor R12 in series with a thirteenth resistor R13 and a fourteenth resistor R14 between the cathode of the sixth diode D6 and the load 104'. A precision programmable voltage reference U2 (also referred to throughout as a voltage reference U2), which in some embodiments is a TL431 precision programmable reference manufactured by Texas Instruments Inc, is connected to a fifteenth resistor R15 and to a connection point between the twelfth resistor R12 and the thirteenth resistor R13. The fifteenth resistor R15 is also connected to ground. The voltage reference U2 is biased by the twelfth resistor R12, while the thirteenth resistor R13 and the fourteenth resistor R14 form a voltage divider to bias the feedback input to the controller U1. In some embodiments, the controller U1 is designed to operate at 2.5V for loop control. Since the output of the voltage reference U1 may be configured to 2.5V by selecting an appropriate value for the twelfth resistor R12, the voltage on the pin 1 of the controller U1 (which, in some embodiments, is $V_{INV}$) is determined utilizing the following equation:

$$V_{INV}=(2.5*R14)/(R14+R13)+I_{Drive}R15 \quad (1)$$

wherein $I_{Drive}$ is the drive current output by the power supply 102 to the load 104'. Since $V_{INV}$ needs to be 2.5V for a stable loop, the following scenario may be assumed:

$$2.5=(2.5*R14)/(R14+R13)+I_{Drive}R15 \quad (2)$$

Solving for the drive current, the following relationship may be seen:

$$I_{Drive}=((2.5-2.5*R14)/(R14+R13))/R15= (2.5/R15)[1-R14/(R14+R13)] \quad (3)$$

The above relationship makes apparent that the drive current may be independent of the input voltage, allowing the drive current to be set simply via selecting at least one resistance value for the thirteenth resistor R13, the fourteenth resistor R14, and/or the fifteenth resistor R15 based on, for example, a type of the load 104' to be driven. The values of the components in the feedback loop (including the fourth resistor R4, the eleventh resistor R11 (connected between the thirteenth resistor R13 and the fourteenth resistor R14), the third capacitor C3, and the fourth capacitor C4) may selected to set the gain to ensure loop stability since the drive current may have a 120 Hz frequency component. The bulk voltage may essentially be an unfiltered 120 Hz full wave rectified waveform.

A flowchart of a method is depicted in FIG. 4. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Further, while FIG. 4 illustrates various operations, it is to be understood that not all of the operations depicted in FIG. 4 are necessary for all embodiments to function. Indeed, it is fully contemplated herein that in some embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

FIG. 4 illustrates a flowchart of example operations for circuitry to generate drive current independent of input voltage. In some embodiments, an optional step 400 involves the power supply 102 being protected only when a potentially harmful influence exists, such as but not limited to a voltage transient, EMI, etc. The power supply (such as but not limited to the power supply 102 of FIGS. 1-3) receives startup power from VDC, step 402, from the front end circuitry 106 into control circuitry 108. The control circuitry 108 continues to operate using the DC voltage received from the front end circuitry 106 until it is determined in step 404 that the power supply 102 is at steady state. The power supply 102 then begins receiving operational voltage from the bias winding W1 in transformer T1, step 406. The power supply 102, more specifically the control circuitry 108, causes the drive circuitry 110 to generate output power based on the output power configuration circuitry 108C, step 408. The drive circuitry 110 then employs the output power to generate a drive current based on the drive current configuration circuitry 110A, step 410. The resulting drive current is then provided to the load 104, step 412.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A power supply to generate a current to drive a load, comprising: front end circuitry to generate a direct-current voltage based on an input voltage; control circuitry to control generation of output power based on the direct-current voltage, the control circuitry including startup circuitry, power factor correction circuitry, and output power configuration circuitry; and drive circuitry to generate the at least one current based on the output power, the drive circuitry including at least drive current configuration circuitry, wherein the drive circuitry comprises a transformer having a primary winding and a secondary winding, wherein the primary winding is connected to the start-up circuitry and the input voltage and the secondary winding is connected to the drive configuration circuitry and not the input voltage.

2. The power supply of claim 1, wherein the front end circuitry comprises protection circuitry.

3. The power supply of claim 2, wherein the protection circuitry comprises a metal oxide varistor to protect the power supply from being damaged by high voltage line transients.

4. The power supply of claim 2, wherein the protection circuitry comprises electromagnetic interference filter circuitry to protect the power supply from being damaged by electromagnetic interference, the electromagnetic interference filter circuitry including: two inductors, each of the inductors being coupled between an alternating-current input voltage and a diode rectifier in the front end circuitry; and a capacitor coupling the two inductors together on a side of each of the two inductors coupled to the diode rectifier.

5. The power supply of claim 1, wherein the power factor correction circuitry comprises a transition-mode power factor correction controller including a pulse width modulation comparator input coupled to a source of a transistor in the drive circuitry.

6. The power supply of claim 5, wherein the two feedback bias resistors in the drive current configuration circuitry have resistance values selected to cause the drive circuitry to generate a certain drive current to drive the load.

7. The power supply of claim 6, wherein the drive current configuration circuitry causes the drive circuitry to generate the certain drive current to drive the load independently of the input voltage.

8. The power supply of claim 5, wherein the output power configuration circuitry comprises a resistor coupled between ground and the pulse width modulation comparator input, the resistor having a resistance value selected to cause the control circuitry to control the drive circuitry to generate a certain output power.

9. The power supply of claim 5, wherein the drive current configuration circuitry comprises: precision programmable reference circuitry; a resistor coupled to the precision programmable reference circuitry to bias the precision programmable reference circuitry; and two feedback bias resistors coupled in series across the precision programmable reference circuitry.

10. The power supply of claim 9, wherein a junction between the two feedback bias resistors in the drive current configuration circuitry is coupled through a resistor to an inverting input of an error amplifier in the transition-mode power factor correction controller.

11. The power supply of claim 1, wherein the startup circuitry comprises: a resistor and a capacitor to generate a voltage to operate the power factor correction circuitry based on the direct-current voltage generated by the front end circuitry during a time period when the power supply is starting; and a diode to generate the voltage to operate the power factor correction circuitry with the capacitor based on voltage generated by the transformer in the drive circuitry following the time period when the power supply is starting.

12. A method comprising: operating control circuitry in a power supply coupled to a load by generating a voltage to operate the control circuitry based on a direct-current voltage generated by front end circuitry; causing drive circuitry in the power supply to generate output power based on output power configuration circuitry in the control circuitry by selecting a resistance value of a resistor in the output power configuration circuitry, the resistor being coupled between ground and a pulse width modulation comparator input in a transition-mode power factor correction controller in the control circuitry; and generating a drive current to drive the load by utilizing the output power in the drive circuitry, the drive current being generated based on drive current configuration circuitry in the drive circuitry, wherein the drive circuitry comprises a transformer having a primary winding and a secondary winding, wherein the primary winding is connected to the control circuitry and the direct-current voltage and the secondary winding is connected to the drive configuration circuitry and not the direct-current voltage.

13. The method of claim 12, further comprising: protecting the power supply utilizing protection circuitry in the front end circuitry.

14. The method of claim 12, wherein operating further comprises: generating the voltage to operate the control circuitry based on the direct-current voltage generated by front end circuitry in the power supply during a time period when the power supply is starting.

15. The method of claim 14, wherein operating comprises: generating a voltage to operate the control circuitry based on a voltage generated by the transformer in the drive circuitry following the time period when the power supply is starting.

16. The method of claim 12, wherein generating comprises: configuring the drive current to be generated by the drive circuitry by selecting resistance values for two feedback bias resistors coupled in series across precision programmable reference circuitry in the drive current configuration circuitry.

17. The method of claim 16, further comprising: providing feedback to an inverting input of an error amplifier in the transition-mode power factor correction controller from a junction between the two feedback bias resistors in the drive current configuration circuitry.

* * * * *